(12) United States Patent
Sheasby et al.

(10) Patent No.: US 6,473,094 B1
(45) Date of Patent: Oct. 29, 2002

(54) METHOD AND SYSTEM FOR EDITING DIGITAL INFORMATION USING A COMPARISON BUFFER

(75) Inventors: Michael Chilton Sheasby, Boucherville; Gabriel Lneien Duford, Fleurimont, both of (CA)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/369,280

(22) Filed: Aug. 6, 1999

(51) Int. Cl.[7] ................................. G09G 5/00
(52) U.S. Cl. ................ 345/629; 345/619; 345/620; 345/621; 345/634
(58) Field of Search ................ 345/629, 619, 345/620, 621, 634, 660

(56) References Cited

U.S. PATENT DOCUMENTS

| | | | |
|---|---|---|---|
| 4,954,883 A | | 9/1990 | Belmares-Sarabis et al. |
| 5,237,648 A | * | 8/1993 | Mills et al. ................. 395/133 |
| 5,270,806 A | * | 12/1993 | Venable et al. ............. 358/500 |
| 5,687,306 A | * | 11/1997 | Blank ........................ 395/135 |
| 5,712,994 A | * | 1/1998 | Jefferson et al. ............ 395/342 |
| 5,852,435 A | * | 12/1998 | Vigneaux et al. ........... 345/302 |
| 6,154,601 A | * | 11/2000 | Yaegashi et al. .............. 386/52 |
| 6,177,929 B1 | * | 1/2001 | Maddalozzo, Jr. et al. . 345/326 |
| 6,181,836 B1 | * | 1/2001 | Delean ....................... 382/302 |
| 6,195,101 B1 | * | 2/2001 | Ghislain Boss et al. .... 345/433 |
| 6,201,548 B1 | * | 3/2001 | Cariffe et al. ............... 345/434 |
| 6,236,389 B1 | * | 5/2001 | Imaizumi et al. ........... 345/145 |

OTHER PUBLICATIONS

Avid Symphony Color Correction Guide, Avid Technology, Inc., Aug. 2000, pp. 1–8, 17–34.

Smoke* User's Guide, Version 3, Discreet Logic, Apr. 1999, pp. 615–631.

* cited by examiner

Primary Examiner—Matthew Luu
Assistant Examiner—Daniel J Chung
(74) Attorney, Agent, or Firm—Peter J. Gordon (57) ABSTRACT

A method and system for comparing a comparison source image to an active project in a viewer, particularly for editing the active project. The comparison source is stored or routed to a comparison buffer, and displayed within a comparison view in the viewer. The comparison view can be sized and positioned as desired to effect the desired editing function.

33 Claims, 8 Drawing Sheets

METHOD AND SYSTEM FOR EDITING DIGITAL INFORMATION USING A COMPARISON BUFFER

FIELD OF THE INVENTION

The present invention relates to computer-based editing systems and methods. More particularly, the present invention relates to a method and system for editing digital information using a comparison buffer.

BACKGROUND OF THE INVENTION

One of the advantages of computer-based digital editing systems is the ease with which a user can manipulate digital information to achieve a desired result. Such systems permit fine control of common editing and composition processes, and allow the user to view the eventual output during the editing process, and refine or tweak the edited information. An example of such a system is SOFTIMAGE|DS v. 3.0.

Much of the editing done in such a digital editing system involves, or is greatly aided by, comparing an arbitrary image, or sequence of images, to an active image that is being edited. For example, on-line editors currently capture a reference image, which the director of a production has said should set the tone for the rest of the sequence. This reference image is then used to wipe against other shots when color correcting them to ensure that continuity is preserved. Typically, this wiping procedure requires a dedicated digital video effects (DVE) channel on the mixing console.

Similarly, when comparing an off-line edit to an on-line reconstruction of a production, current editing systems require that the off-line edit be digitized and use a DVE channel on a switcher.

Moreover, previous editing systems provide very little flexibility in the manner in which two images can be viewed simultaneously in a viewer.

It is, therefore, desirable to provide a method and system that permits a user to view a comparison image without consuming a DVE channel, and to manipulate or modify the comparison image.

SUMMARY OF THE INVENTION

The present invention provides a system and method for editing digital information, such as digital video, digital audio, animations and the like, forming a digital video or multimedia production. In particular, the present invention provides a digital editing system and method having a comparison buffer that permits a number of editing functions, such as color correction, onion-skinning, and wiping, to be accomplished more efficiently.

In a first aspect of the present invention, there is provided a method for editing digital information in a digital editing system. The method starts by displaying an active project, upon which a desired editing function is to be performed, in a viewer. A comparison source is then captured in a comparison buffer for performing the editing function. The captured comparison source is displayed in a comparison view that overlays the project in the viewer. The properties of the comparison view are then adjusted to permit simultaneous viewing of the project and the comparison view in the viewer, to permit the desired editing function to be performed. For example, a sequence of frames, immediately preceding or following a frame of the project, can be captured and displayed transparently to permit an onion-skinning edit function to be performed.

In a further embodiment of the method of the present invention, the size of the comparison view can be adjusted to permit simultaneous viewing of the project view and the comparison view in the viewer. Sizing includes cropping and scaling the comparison view. The comparison view can also be positioned within the comparison view, either by translating the comparison view within the viewer, or scrolling the comparison source within the comparison view. Using these features, a static image can be captured and displayed in the comparison view, and then manipulated through sizing and positioning to permit a color correction function to be performed, such as for wiping an image. Alternatively, an alpha channel of the project can be captured in the comparison view to permit the user to simultaneously view the alpha channel and the RGB channels.

In another embodiment of the method of the present invention, an edge of the comparison view can be highlighted in response to a user input, such as positioning a cursor over the comparison view. This feature allows the user to locate the comparison view within the viewer.

In a further aspect of the present invention, there is provided a method for processing a digital video production in a digital post-production editing system. A digitally reconstructed on-line project is displayed in a viewer. An off-line project, from a external video source, is captured to a comparison buffer attached to the viewer. Typically, the off-line project is the original, unprocessed, work edit of the final production. The off-line project is displayed in the viewer, and overlays the on-line project. The displayed off-line project is sized to permit simultaneous viewing of the on-line project and the off-line project in the viewer. The on-line and off-line projects can then be compared to detect undesired variations, such as dropped frames and timing shifts, in the on-line project, and to correct the undesired variations. During the comparison process, the external video source is under the control of the digital post-production editing system.

To accomplish the above method, the present invention provides a digital post-production editing system. The system includes a viewer for displaying an active project. A comparison buffer captures a desired comparison source, which is displayed within a comparison view in the viewer. A sizing tool, such as handles at the edges of the comparison view, permits the comparison view to be cropped or scaled to permit simultaneous viewing of the project and the comparison view in the viewer. A positioning tool, such as dragging with a mouse, allows the comparison view to be moved within the viewer, and the comparison source to be scrolled within the comparison view. Conventional editing tools then permit the desired editing function to be performed.

BRIEF DESCRIPTION OF THE DRAWINGS

Preferred embodiments of the present invention will now be described, by way of example only, with reference to the attached Figures, wherein.

DETAILED DESCRIPTION

Figure 1:
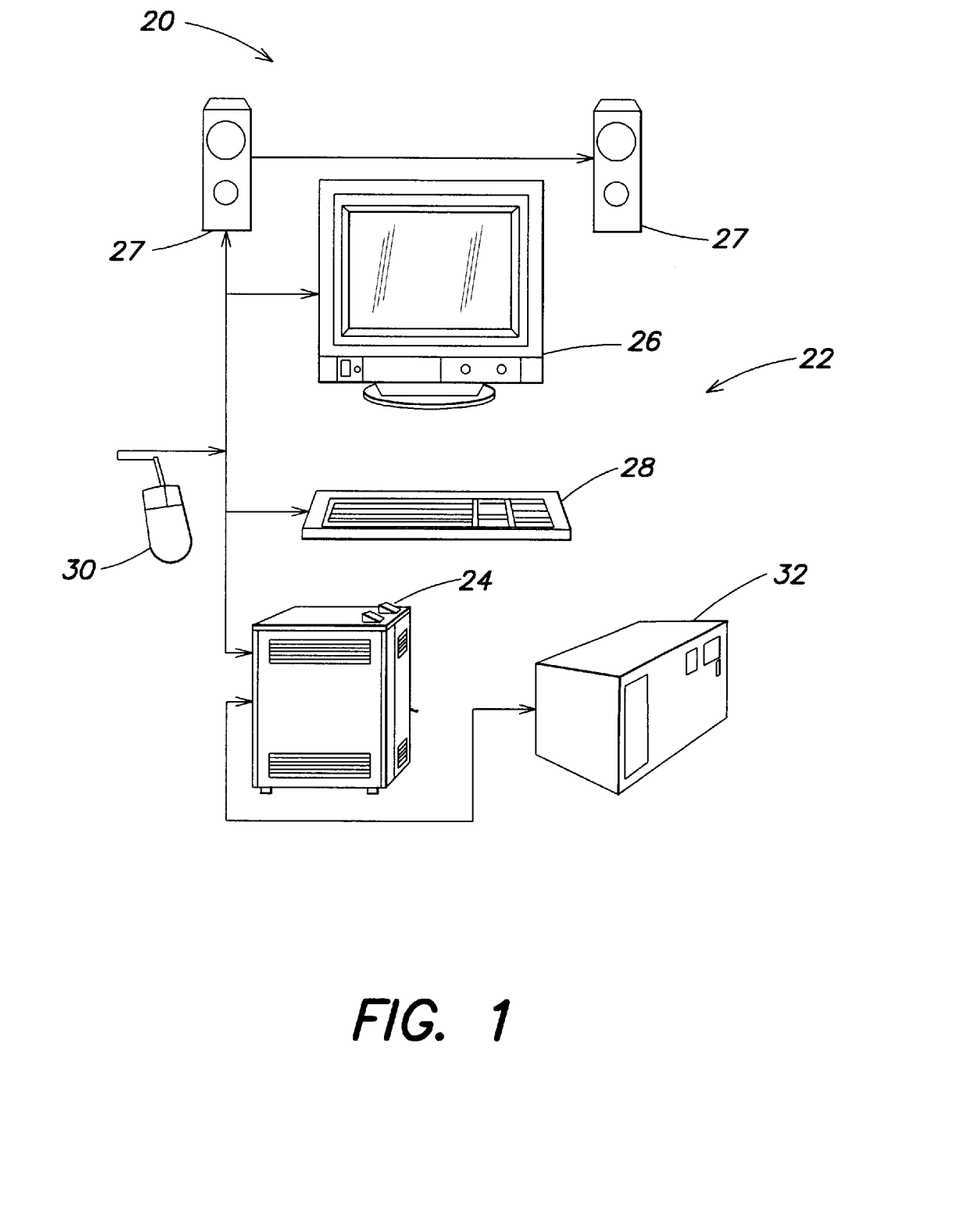
FIG. 1 is a schematic of an editing system according to an embodiment of the present invention.

A digital post-production editing system and apparatus is indicated generally at 20 in FIG. 1. System 20 comprises one or more workstations 22, each of which includes a general purpose computer 24, such as a personal computer with a 400 MHz Intel Pentium II processor executing the Windows NT v.4.0 operating system. Computer 24 is provided with an appropriate animation or digital post-production software application, such as SOFTIMAGE|3D v.3.7 or SOFTIMAGE|DS v.3.0. Computer 24 is equipped with one or more appropriate special purpose peripheral processor cards, such as a DigiSuite video card set manufactured by Matrox and a Kefren sound processing card manufactured by Merging Technologies. A video display 26, such as a 21 inch NEC Multisync monitor, speakers 27, a number of input devices, such as a keyboard 28, a mouse 30, a digitizer, and/or an audio playback system (not shown), are operatively connected to computer 24. Workstations 22 can also include peripheral editing equipment such as video and audio tape, or disk, recording and playback devices.

Computer 24 is also operatively connected to a relatively large capacity random access storage means 32. In a presently preferred embodiment, storage means 32 comprises a RAID storage array, such as a model 6900 RAID storage device manufactured by Ciprico. Such RAID arrays are presently preferred as random access storage devices as they combine acceptable retrieval speed with large capacity, however any other suitable storage device can also be employed with the present invention, as will occur to those of skill in the art. For example, in some circumstances, for speed or other reasons, digital information can be stored in RAM in computer 24 while one or more projects are being prepared, or rendered with system 20. Accordingly, as used herein, the term "storage means" is intended to comprise a RAID storage device or the like, RAM memory in computer 24 and any other suitable random access storage techniques and/or devices wherein digital information can be maintained for use by system 20.

As will be understood by those of skill in the art, digital information is loaded onto storage means 32 by users as required. For example, video information from an analog source can be digitized to a desired resolution, or resolutions, and loaded onto storage means 32. Digital video information can be transferred directly to storage means 32, from optical disc, tape or other storage means, or via a network connection, still image source information, and any other desired source material can be digitized, if necessary, and loaded onto storage means 32 as desired. The loading of information onto a storage means is accomplished by loading directly from a desired source, or as the result of an intermediate rendering of an effect or the like.

Figure 2:
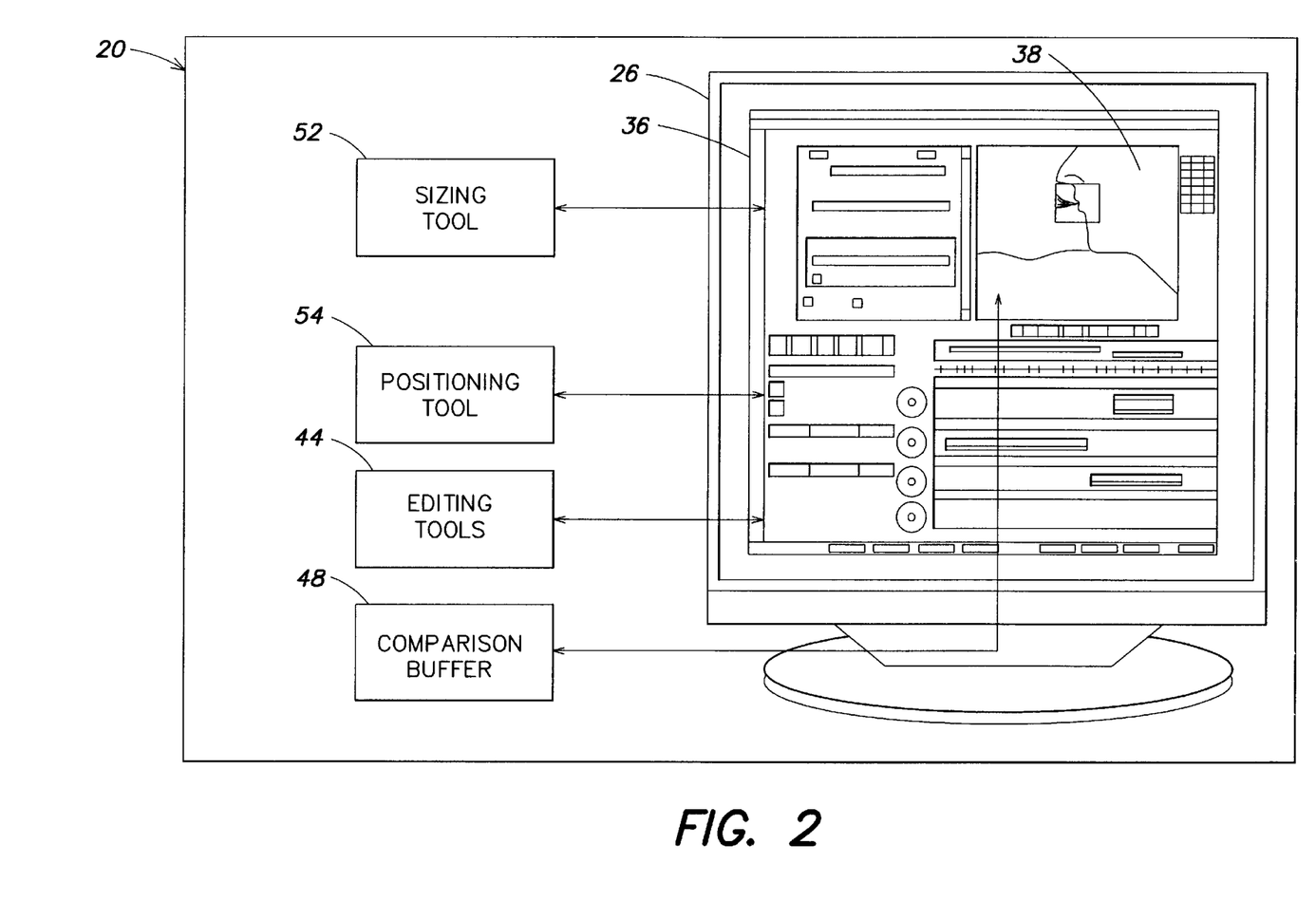
FIG. 2 is a schematic of features of the editing system of FIG. 1.
Figure 3:
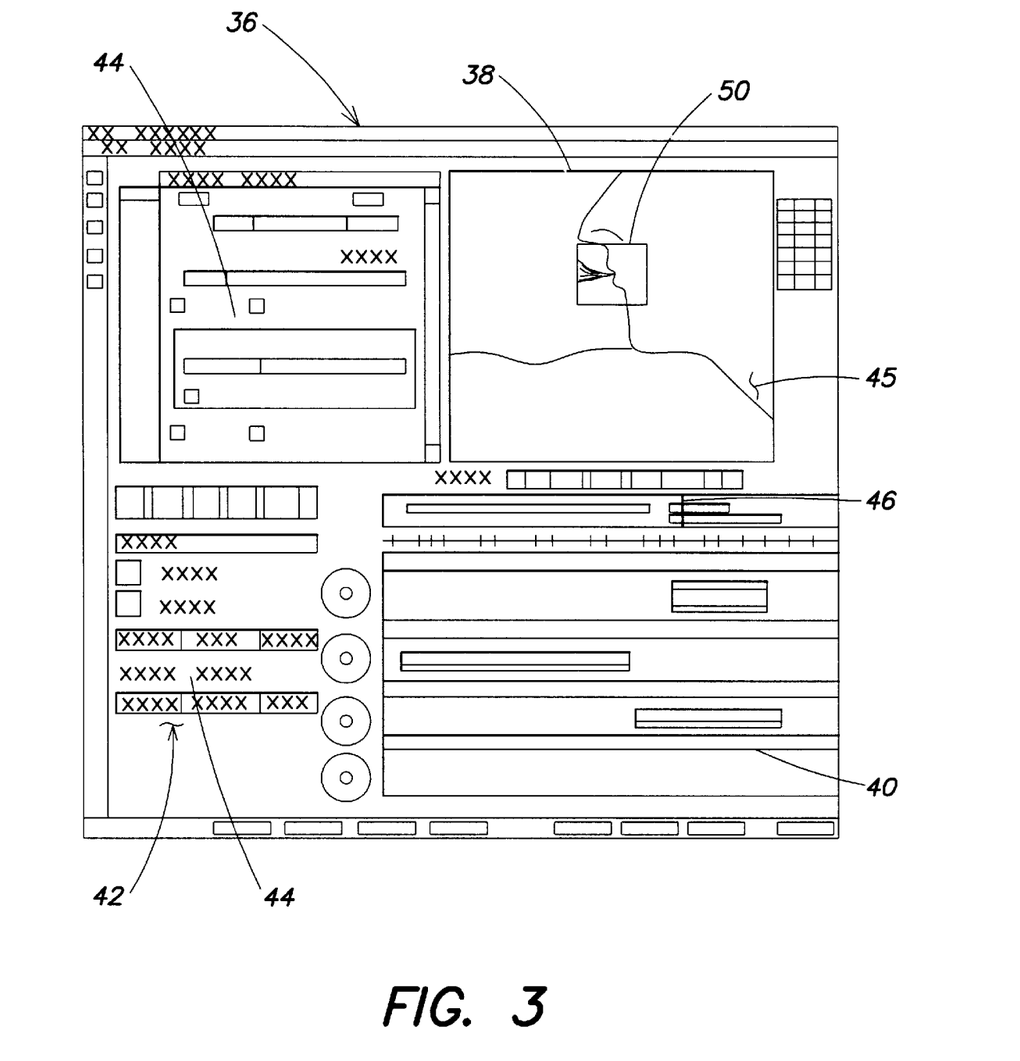
FIG. 3 shows the user interface of FIG. 2.

Referring to FIGS. 2 and 3, components of system 20 particular to the present invention are shown. Displayed on display 26 is a typical graphical user interface 36. The illustrated user interface 36, shown in greater detail in FIG. 3, is a SOFTIMAGE|DS 3.0 interface that includes a viewer 38, a timeline 40 and tool panels 42 containing editing tools 44. Editing tools 44 can include well known tools for wiping, cutting, dissolving, color correction, onionskinning, etc.

Viewer 38 displays a project 45. This project is referred to as the active project, and is the one which is to be edited. The view of project 45 that is displayed in viewer 38 corresponds to the position of a cursor 46 on timeline 40. A project, or production, is a collection of digital video, audio and/or multimedia information, and can include single images and clips, or sequences thereof, arrayed along timeline 40. As used herein, "edit" is defined as any modification of the digital information forming a digitized project, and is not limited to the process of cutting between video or audio sequences.

A comparison buffer 48 is attached to viewer 38, the contents of which can be displayed in a comparison view 50. Comparison buffer 48 is a memory location, such as a cache, or other suitable storage means, that can hold a selected, or captured, comparison source. Comparison view 50 overlays the digital project view. A sizing tool 52 and a positioning tool 54 are associated with comparison buffer 48, and permit the size and position of comparison view 50 to be modified. As is well known in the art, sizing tool 52 and positioning tool 54 can be controlled by the user input devices, such as keyboard 28 and mouse 30. For example, sizing tool 52 can be controlled by dragging the corners and edges of comparison view 50 to permit comparison view 50 to be cropped or scaled, as desired, and to permit simultaneous viewing of project 45 and comparison view 50. Positioning tool 54 can be controlled by dragging comparison view 50 to a desired position, or the image in comparison view 50 can be scrolled, or panned, within comparison view 50 under mouse or keyboard control.

Figure 4:
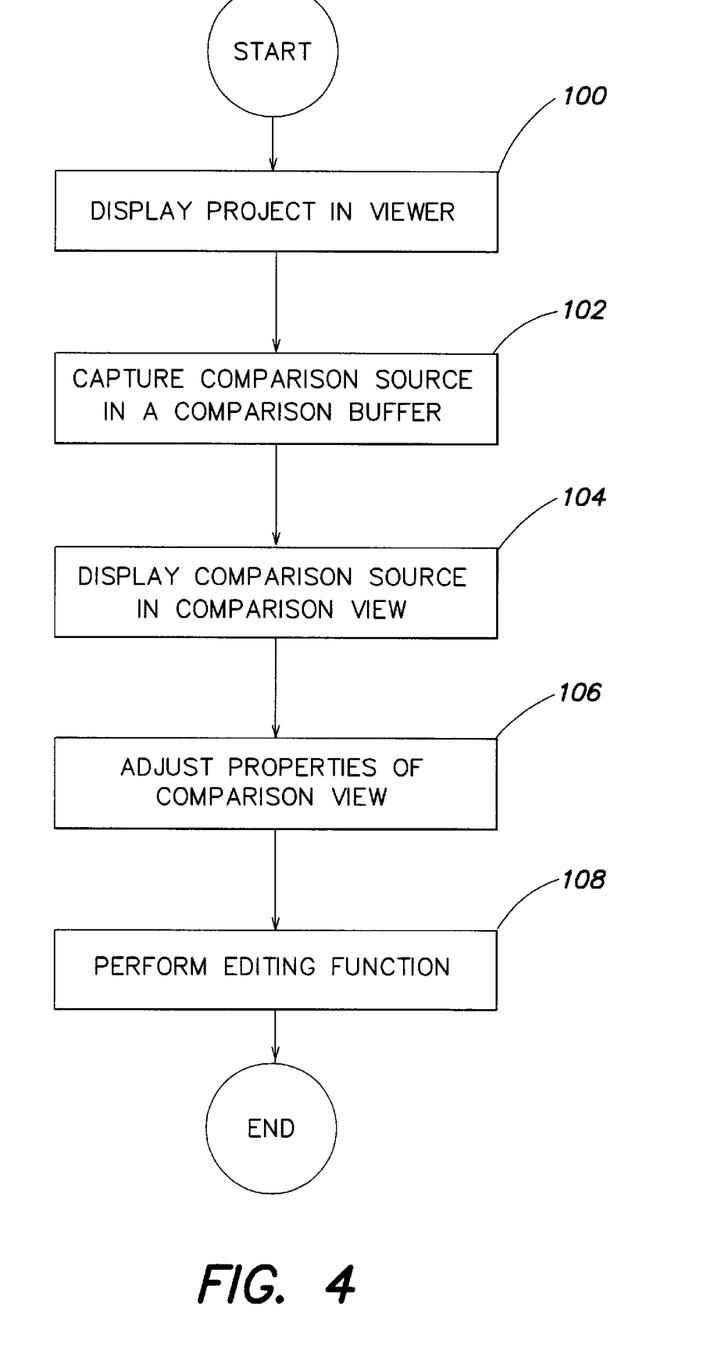
FIG. 4 is a block diagram of a first embodiment of a method for editing digital information according to the present invention.

Generally, as shown in the block diagram of FIG. 4, system 20 provides a method for editing digital information. The method commences at step 100 where project 45 is displayed in viewer 38. At step 102, a comparison source is captured in comparison buffer 48 in order to perform a desired editing function on project 45. Next, at step 104, the captured comparison source is displayed in comparison view 50, which overlays project 45 in viewer 38. The properties of comparison view 50 can then be adjusted at step 106 such that both project 45 and comparison view 50 are visible within viewer 38. Finally, at step 108, the desired editing function is performed, as appropriate, on project 45.

Figure 5:
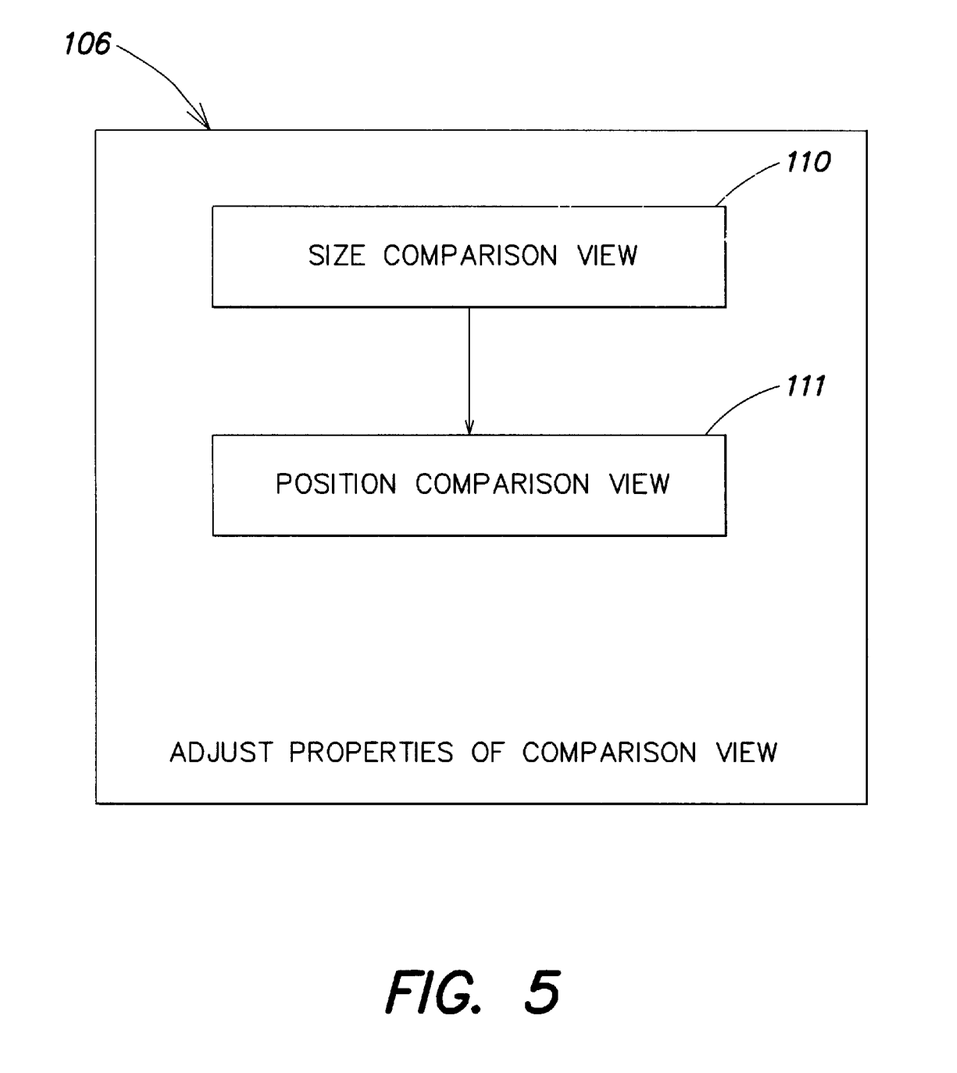
FIG. 5 is a block diagram of a second embodiment of a method for editing digital information according to the present invention.

Referring to FIG. 5, a further embodiment of the method of the present invention is shown. The step 106 of adjusting the properties of comparsison view 50 is expanded to include sizing comparison view 50 using sizing tool 52 at step 110, and positioning comparison view 50 within viewer 38 at step 111.

Figure 6:
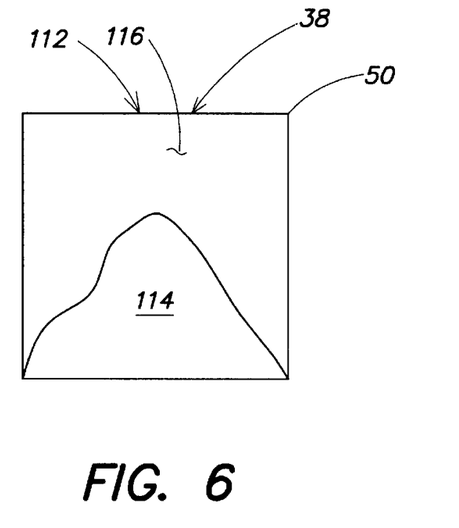
FIG. 6 is a view of a first clip in a viewer.
Figure 7:
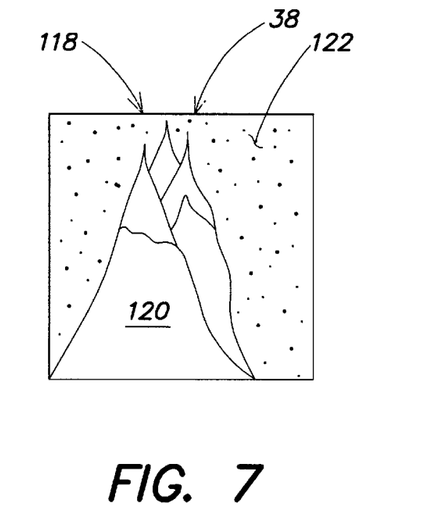
FIG. 7 is a view of a second clip in a comparison view.
Figure 8:
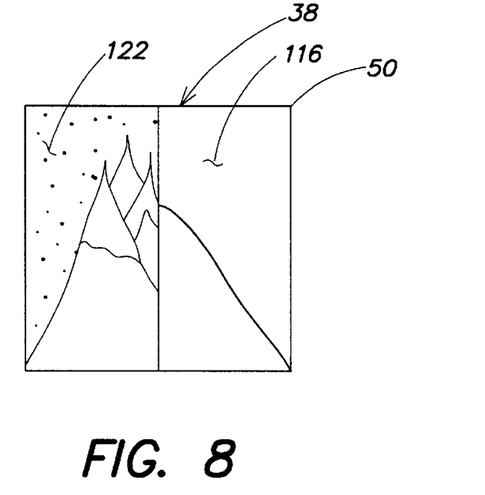
FIG. 8 is a view of a the comparison view of FIG. 7 overlaying the clip of FIG. 6.
Figure 9:
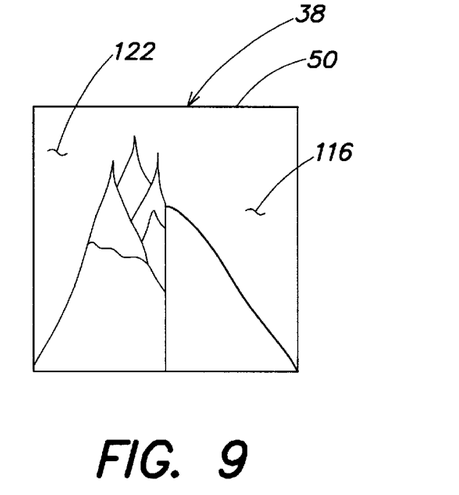
FIG. 9 is the view of FIG. 8 after a color correction has been performed.

A first example of the present invention is illustrated by FIGS. 6–9. The active project includes a transition between a first clip 112 of a hill 114 against a first background 116, such as a blue sky, and a second clip 118 of a mountain 120 against a second background 122, such as a darker blue sky. To achieve a smooth horizontal wipe, having proper continuity, between first clip 112 and second clip 118, it is desired to perform a color correction to match the sky colors in the two clips. To do so, a static image from first clip 112 is captured to comparison buffer 48 by an appropriate keystroke or menu selection. The user then moves to the second clip 118, which is displayed in viewer 38, as shown in FIG. 7. Comparison view 50 is then activated to display the content of comparison buffer 48, and displayed in viewer 38. Initially, comparison view 50 fills viewer 38, as shown in FIG. 6. In order to compare the sky colors of the two clips, the user adjusts the size of comparison view 50 such that it fills only half of viewer 38, as shown in FIG. 8. The user then performs the appropriate color correction to match second background 122 to first background 116, as shown in FIG. 9. The direct comparison afforded by comparison view 50 allows the user to perform an accurate color correction without dropping a comparison source onto timeline 40.

Figure 10:
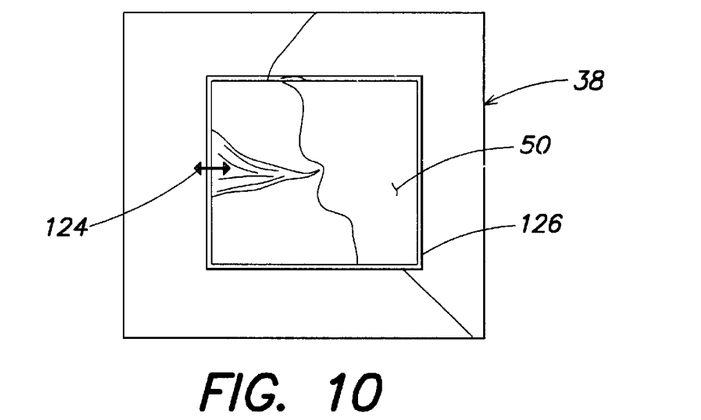
FIG. 10 shows a comparison view undergoing sizing and displaying an alpha channel.
Figure 11:
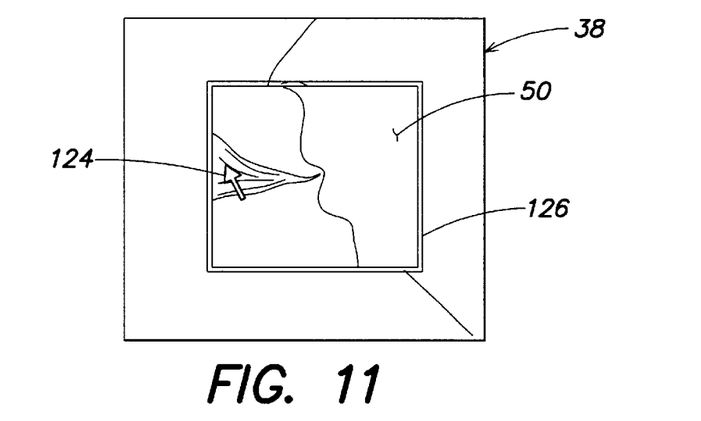
FIG. 11 shows the comparison view of FIG. 10 undergoing positioning.

As shown in FIGS. 10 and 11, further manipulation of comparison view 50 can performed using sizing tool 52 and positioning tool 54. FIG. 10 shows comparison view 50 cropped both horizontally and vertically. A mouse cursor 124 is placed over an edge 126 of comparison view 50. Edge 126 can then be dragged until comparison view 50 is a desired size. As is well known to those of skill in the art, edge 126 can be dragged from any of the four sides of comparison view 50, and from the corners by appropriate mouse clicks and manipulation. The sizing of comparison view 50 can also be changed by scaling, rather than by cropping. FIG. 11 shows comparison view 50 being moved, or positioned, within viewer 38. Mouse cursor 124 is positioned within comparison view 50, and comparison view 50 is then dragged to a desired position. The position of the image, or comparison source, within comparison view 50 can also be changed by scrolling the image within comparison view 50. Both sizing and positioning of comparison view 50 can also be controlled from keyboard 28, such as by modifying grid coordinates within viewer 38 to specify the size and position of comparison view 50.

Figure 12:
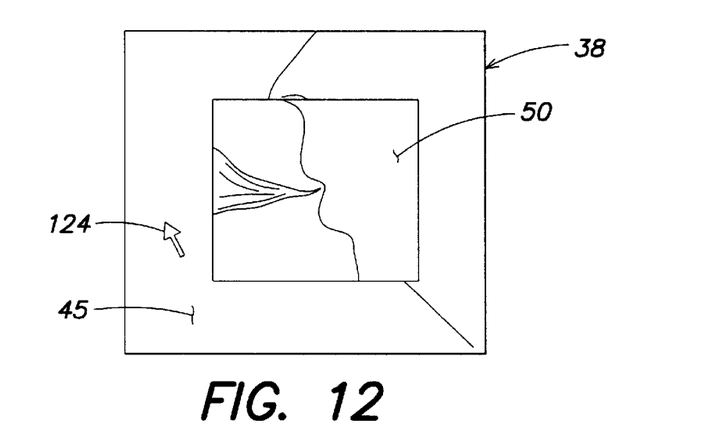
FIG. 12 shows the comparison view of FIG. 10 without highlighting.

FIGS. 10–12 also illustrate the highlighting feature of the present invention. In order to allow the user to locate comparison view 50 within viewer 38, edge 126 of comparison view 50 is highlighted in response to a user input, in this case the positioning of mouse cursor 124 anywhere within viewer 38, as shown in FIGS. 10 and 11. As shown in FIG. 12, when cursor 124 is placed outside comparison view 50 the highlighted edge 126 disappears. This permits the user to perform to directly compare the comparison view 50 to the project 45, without interference from highlighted edges, when performing the desired editing function.

Referring to FIGS. 10–12, a further example of the present invention is shown. In this example, the comparison source captured to comparison buffer 48, and displayed in comparison view 50, is a channe, in this case the alpha channel, of a foreground image to be composited with the active project, a background image. Capturing alpha channel allows the user to view the alpha channel while, for example, keying the background image In a further example of the present invention, a user can perform an onion-skinning operation. Onion-skinning is a well known editing function that, in traditional animation, involves drawing each frame on separate transparent sheets. The sheets are then stacked to permit the animator to see the current frame in the context of previous and/or next frames. In a digitally composed production, it may, for example, be desired to paint an animated object directly on to frames of the clip. To simulate onion-skinning, N previous or next frames can be captured to comparison buffer 48. The N frames can then be displayed transparently in comparison viewer 50 by suitably adjusting its properties, one at a time or all together, such that the current, active frame is also visible and can be edited as desired.

Figure 13:
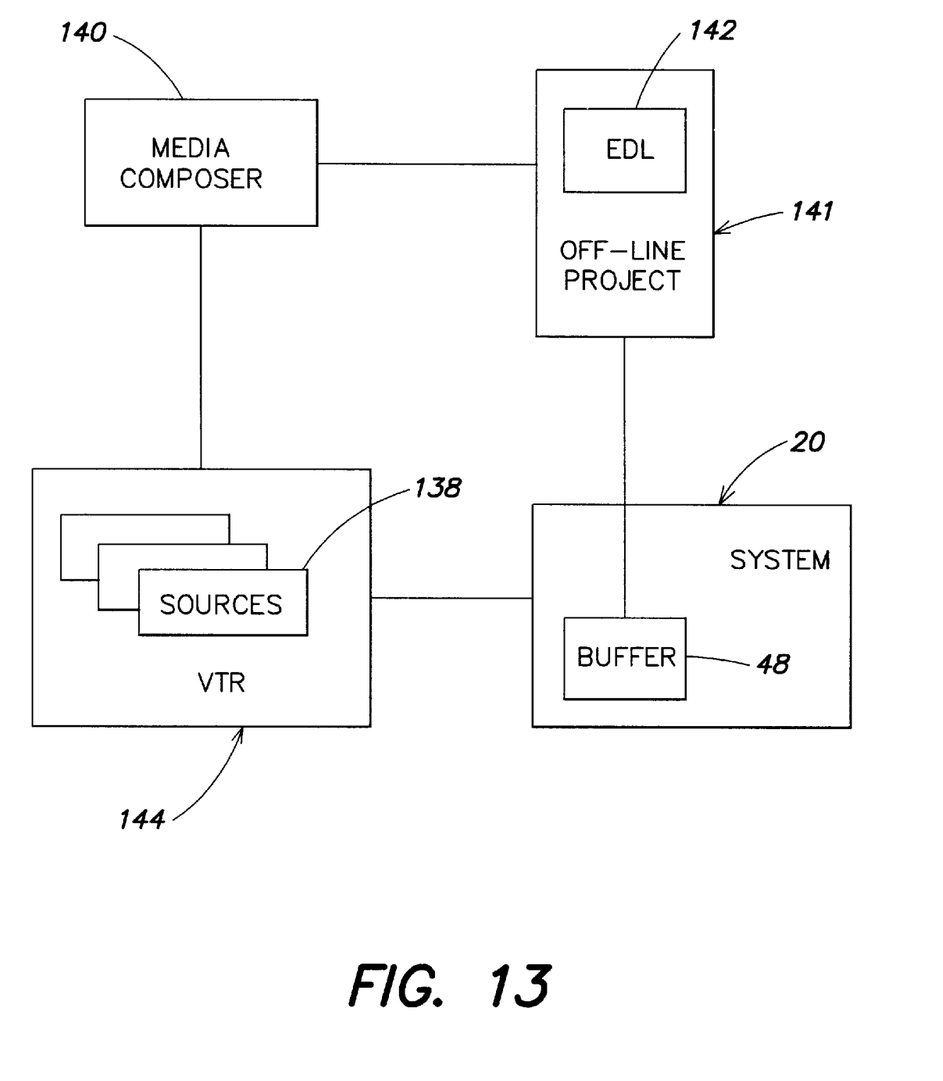
FIG. 13 is a block diagram of the present system using an external comparison source.

Referring to FIG. 13, yet another embodiment of the present invention involves capturing an external source to comparison buffer 48. For example, in the final processing of a digital video production in a digital post-production editing system it is necessary to ensure that the final production corresponds to the director's desired edit. In creating a video production, a director uses multiple source recordings 138, both video and audio. During an initial editing session using a media composer 140, the director prepares a work edit 141, or off-line project, that is a compilation of audio and video sequences from the multiple source recordings 138. Each edited sequence can be described in terms of its source entry/exit timecodes, a transition type (e.g. cut, wipe, or dissolve), the edit mode (video/audio), annotations and record entry/exit timecodes. This information is compiled in an edit decision list (EDL) 142 that can be used to direct the output of the final production. Typically, the production is then further edited in digital post-production editing system 20. To accomplish the post-production editing, the production is first reconstructed according to EDL 142, and digitized. An external source, such as a VTR 144, capable of playing back the multiple source recordings 138, and under the control of digital post-production system 20, is used in the reconstruction However, as is well known, such reconstructions are rarely exact, and after the production has been digitally modified, it is necessary to compare the work edit 141 to the final production to ensure that frames have not been dropped, and that sequences have not shifted along timeline 40. Previously, it was necessary to dedicate a DVE channel, on a switcher for the off-line project, to perform such a comparison.

Using the present invention, the user can display the digitally reconstructed production, or on-line project, in viewer 38. The off-line project 141, or work edit, can be captured in comparison buffer 48, and displayed in a comparison view 50 overlaying the on-line project. The off-line project is viewed directly from the external VTR 144 as specified by EDL 142. The off-line project can then be sized to permit simultaneous viewing of the on-line project and the off-line project in viewer 38. The on-line and off-line projects can then be played back simultaneously, and compared to detect undesired variations in the on-line project. Playback can then be paused, and the on-line project suitably edited to correct the undesired variations.

Generally, the system and method of the present invention permit a user to more efficiently accomplish a number of common editing functions, including color correction, wiping, painting, and comparing off-line edits to on-line reconstructions. The ability to capture a static image, such as a frame of a clip, to comparison buffer 48 and display it in comparison view permits a user to compare colors or channels while doing a color correction, wipe or keying an image. The buffer 48 does not consume a DVE channel nor does it have to be dropped on the timeline 40, and it is always available to the viewer 38. The ability to adjust the image within comparison view 50 allows the user to position the comparison source image precisely where it is most effective. The highlighted edges of comparison view 50 permit it to be readily located within viewer 38, by merely moving the mouse within viewer 38, while the fact that the highlighting is turned off when the mouse is outside the comparison view 38 permits the user to have a exactly compare the comparison source to the active project. The ability to capture a number of previous or next frames permits a user to perform an onion-skinning function, which is particularly useful when a painting an image to animate a feature. Finally, the ability to capture an off-line project from an external source to comparison buffer 48 permits an off-line project to be compared to an on-line project without digitizing the off-line project.

The foregoing is by way of example only. Modifications, variations, and alterations may be made to the described embodiments without departing from the scope of the invention, which is defined solely in the claims.

We claim:

1. A method for editing digital information in a digital editing system, comprising:

displaying an active project in a viewer;

capturing a comparison source in a comparison buffer for performing a desired editing function on a project;

displaying the comparison source in a comparison view overlaying the project in the viewer;

adjusting properties of the comparison view to permit simultaneous viewing of the project in the viewer, including sizing the comparison view and positioning the comparison view for performing the desired editing function;

permitting a user to change position of the comparison source within the comparison view that is displayed on the project display; and performing the desired editing function.

2. A method according to claim 1, wherein the step of capturing the comparison source includes capturing a sequence of frames for performing an onion-skinning edit function.

3. A method according to claim 1, wherein the step of capturing the comparison source includes capturing a static image.

4. A method according to claim 3, wherein the desired editing function includes color correction.

5. A method according to claim 1, wherein the step of capturing including capturing a channel of an image.

6. A method according to claim 5, wherein the channel is an alpha channel.

7. A method according to claim 1, wherein the step of capturing the comparison source includes capturing an external source.

8. A method according to claim 1, wherein the step of sizing including cropping the comparison view.

9. A method according to claim 1, wherein the step of sizing includes scaling the comparison view.

10. A method according to claim 1, wherein the step of positioning includes translating the comparison view within the viewer.

11. A method according to claim 1, wherein a change in position of the comparison source within the comparison view includes scrolling the comparison source within the comparison view.

12. A method according to claim 1, further including a step of highlighting an edge of the comparison view in response to user input.

13. A method according to claim 12, wherein the user input includes positioning a cursor over the comparison view.

14. A method for processing a digital video production in a digital post-production editing system, comprising:

displaying a digitally reconstructed on-line project in a viewer;

capturing an off-line project from an external video source in a comparison buffer;

displaying the off-line project in a comparison viewer overlaying the viewer displaying the on-line project;

sizing the comparison viewer to permit simultaneous viewing of the on-line project in the viewer and the off-line project in the comparison viewer;

changing position of the off-line project within the comparison viewer;

comparing the on-line project to the off-line project to detect undesired variations in the on-line project; and editing the on-line project to correct the undesired variations.

15. A method according to claim 14, wherein the external video source is under the control of the digital post-production editing system.

16. A method according to claim 14, wherein the undesired variations include dropped frames.

17. A method according to claim 14, wherein the undesired variations include timing shifts.

18. A digital post-production editing system, comprising:

a viewer for displaying an active project;

a comparison buffer for capturing a comparison source, the comparison source displayed within a comparison view in the viewer;

a sizing tool for sizing the comparison view to permit simultaneous viewing of the project and the comparison source in the viewer;

a positioning tool for positioning the comparison view to permit a desired editing function to be performed on the project;

a source tool for positioning the comparison source within the comparison view; and editing tools for performing the desired editing function.

19. A system according to claim 18, wherein the comparison source includes a static image.

20. A system according to claim 19, wherein the desired editing function includes color correction.

21. A system according to claim 18, wherein the comparison source includes a sequence of frames.

22. A system according to claim 21, wherein the desired edit function includes an onion-skinning function.

23. A system according to claim 18, wherein the comparison source includes an external source.

24. A system according to claim 18, wherein the sizing tool crops the comparison view.

25. A system according to claim 18, wherein the sizing tool scales the comparison view.

26. A system according to claim 18, wherein the positioning tool translates the comparison view within the viewer.

27. A system according to claim 18, wherein the source tool scrolls the comparison source within the comparison view.

28. A system according to claim 18, wherein an edge of the comparison view is highlighted in response to a user input.

29. A system according to claim 28, wherein the user input includes positioning a cursor over the comparison view.

30. A graphical user interface for image editing, comprising:

a project display for displaying to the user an image of a project being edited;

means for allowing a user to select an image for storage in a comparison buffer;

means for allowing the user to initiate display of contents of the comparison buffer;

means, operative in response to the user initiating display of the contents of the comparison buffer, for displaying a comparison window as an overlay at a position on the project display and for displaying contents of the comparison buffer in the comparison window;

means for allowing the user to change position of the displayed contents of the comparison buffer within the comparison window;

means for allowing the user to adjust at least the position of the comparison window on the project display; and means for allowing the user to edit the project and for updating the image displayed in the project display during editing of the project, during display of the comparison window on the project display.

31. The graphical user interface of claim 30, wherein the comparison buffer includes a static image.

32. The graphical user interface of claim 30, wherein the comparison buffer includes a sequence of images.

33. The graphical user interface of claim 30, wherein editing of the project includes color correction of the project.

* * * * *